Patented July 27, 1943

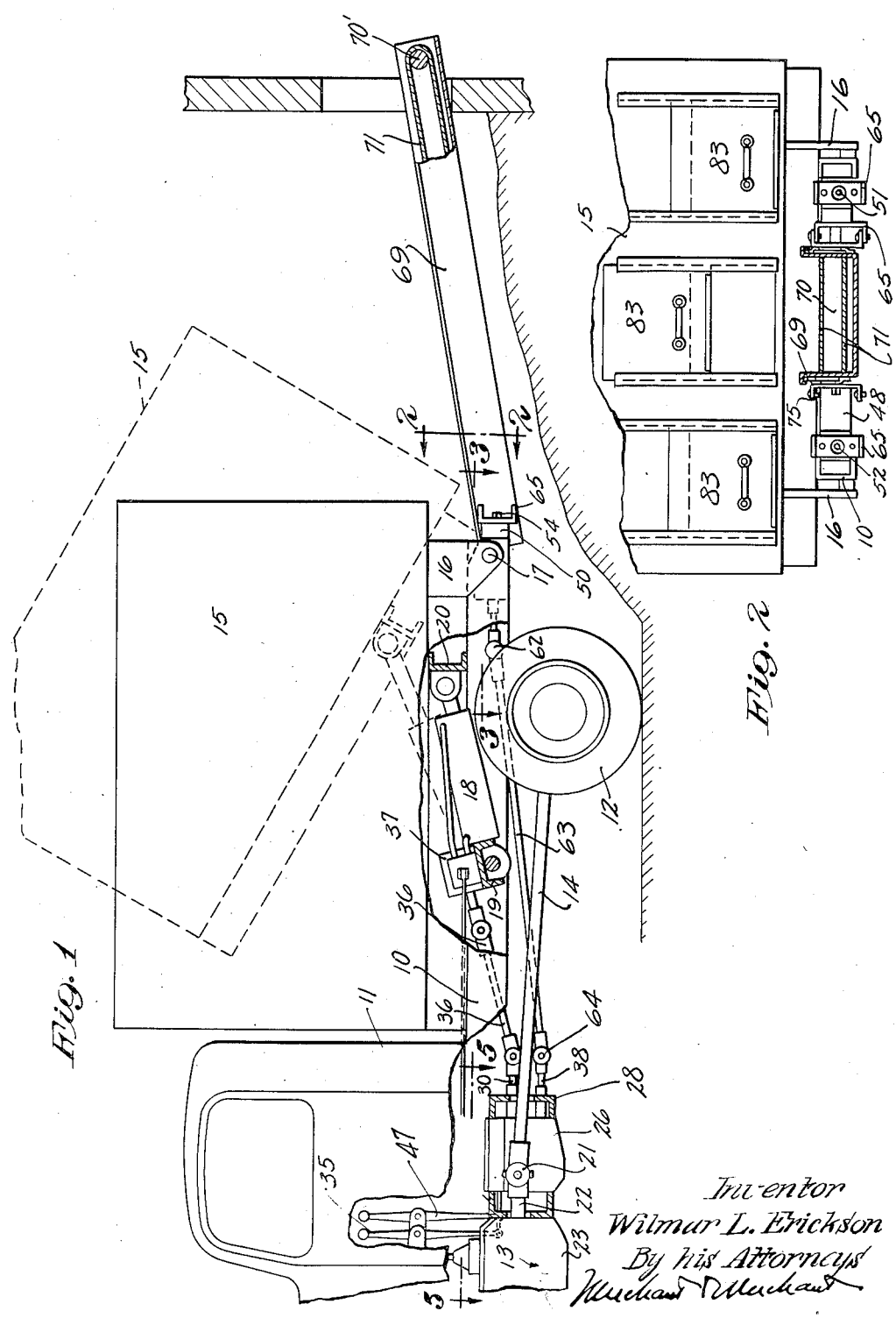

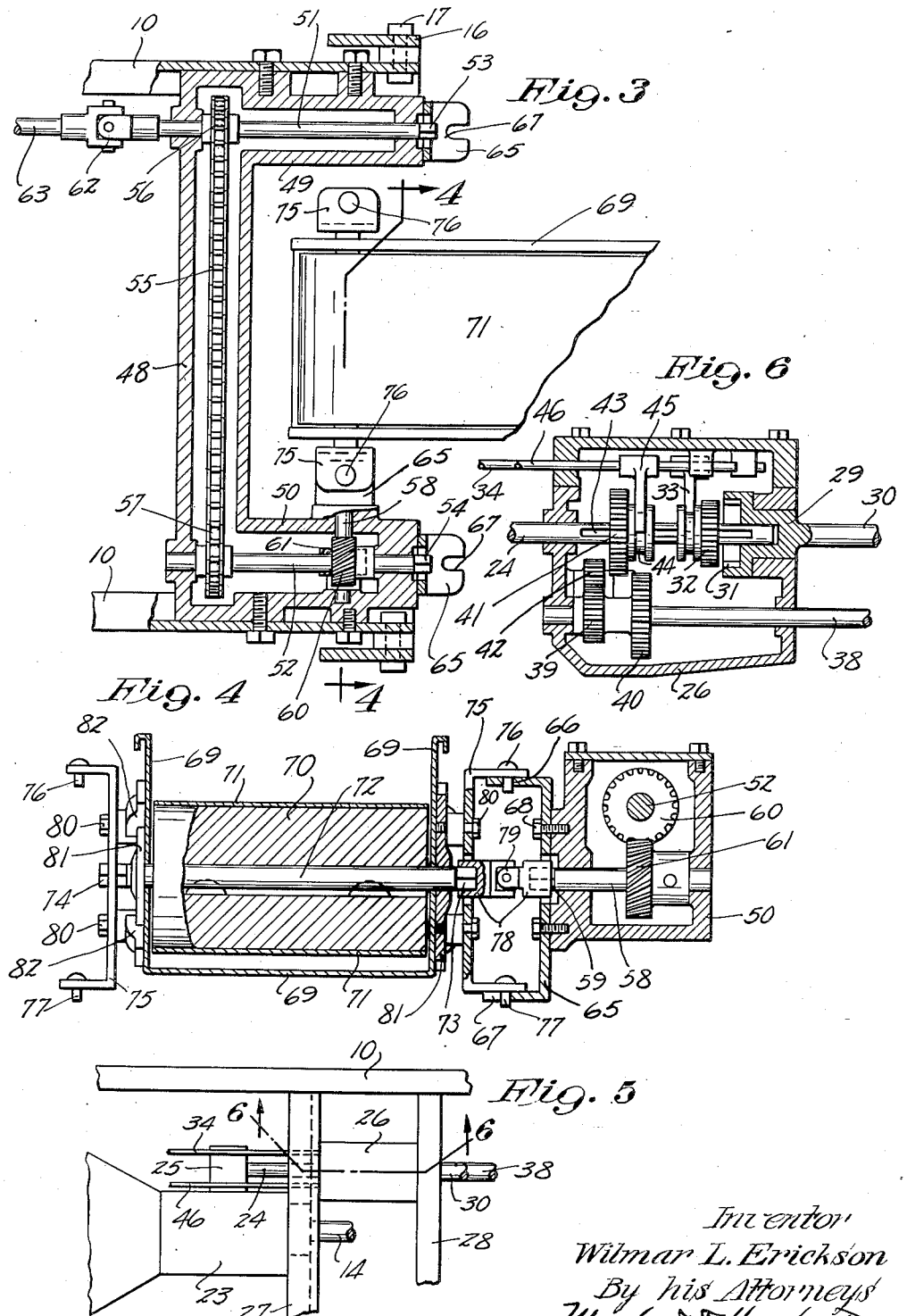

2,325,492

UNITED STATES PATENT OFFICE 2,325,492

DETACHABLE TRUCK UNLOADER

Wilmar L. Erickson, Robbinsdale, Minn.

Application October 24, 1942, Serial No. 463,190

4 Claims. (Cl. 214—83)

My present invention relates to truck unloading and loading devices of the type adapted to be attached to motor-driven trucks and to be driven from the truck engine. In a general way, the invention relates to unloading devices of the type disclosed and claimed in my pending application entitled "Detachable truck unloader," filed November 10, 1941, under Serial No. 418,484 and now U. S. Patent No. 2,304,249, issued of date December 8, 1942.

A commercial form of the present improved device is illustrated in the accompanying drawings wherein like characters indicate like parts throughout the several views.

Referring to these drawings:

Fig. 1 is a view in side elevation showing a truck with my invention applied thereto, some parts being broken away and some parts being shown in vertical longitudinal section;

Fig. 2 is a view looking at the rear end of the truck and some parts being sectioned on the line 2—2 of Fig. 1, upper portions of the truck body being broken away and some of the under structure of the truck being omitted;

Fig. 3 is a horizontal section taken on the line 3—3 of Fig. 1, some parts being broken away;

Fig. 4 is a section taken on the line 4—4 of Fig. 3;

Fig. 5 is a detail in plan showing parts found just below the line marked 5—5 on Fig. 1; and Fig. 6 is a section taken approximately on the line 6—6 of Fig. 5.

Of the parts of the truck, which is or may be of any suitable construction, the numeral 10 indicates the framework of the chassis, the numeral 11 the cab, the numeral 12 the rear or traction wheels, the numeral 13 the transmission gear box, and the numeral 14 the customary transmission and shaft which conveys power from the truck engine to the rear wheels 12 through the customary or any suitable connections including the usual differential gear mechanism, not shown.

The numeral 15 indicates the dumping body of the truck which, at its rear end, has heavy hinge lugs 16 pivoted to the rear of the truck frame 10 at 17 and capable of movements from the normal dotted line position shown by full lines into the tilted or dumping position shown by dotted lines. The dumping and return movements of the truck body are shown as arranged to be power operated from a cylinder and piston air motor 18 of the usual arrangement, interposed between an anchoring beam 19 and a beam 20. The anchoring beam 19 extends transversely of and is rigidly secured to the truck frame 10 while the beam 20 is secured to the bottom of the dumping body 15.

The transmission shaft 14, by a universal joint 21, is connected to the primary power shaft 22 which, as is customary in standard motor structures, is driven from well-known variable speed reversible gear mechanism contained within the transmission casing 23.

In standard auto truck structures it is customary to provide a power take-off shaft for various purposes such as for conveying power to mechanism for operating the dumping platform or body of a truck equipped with such dumping platform or body. In the present case the primary power take-off shaft is indicated by the numeral 24. This power take-off shaft 24, in the present instance, extends from a gear box 25 secured on and projecting from the side of the transmisison casing 23 and through gear mechanism, not shown, but of the well-known arrangement contained within said box 25 is driven from the gears of the variable speed transmission mechanism contained within said transmission casing. As a novel feature in the present arrangement, this power take-off shaft 24 is used not only to transmit power to the dump controlling mechanism, but through novel mechanism is used to transmit power to the unloading attachment of the device. In carrying out this scheme a gear box or housing 26 is rigidly secured to transverse metal beams 27 and 28 of the gear frame 10, see particularly Fig. 5. As best shown in Fig. 6, this primary power take-off shaft 24 is extended into the gear box 26 and is extended axially into the hub 29 of the second section 30 of the primary power take-off shaft. Within the box 26 the hub 29 is formed with an internally toothed clutch member 31 that is adapted to be engaged and disengaged by a gear-like clutch member 32 that is keyed to slide on but to rotate with the take-off shaft 24.

Clutch member 32 has a grooved hub that is engaged by the shipper fork or arm 33 of a shipper rod 34 that is mounted to slide in suitable bearings afforded by the box 26. Shipper rod 34 may be operated endwise by any suitable means but, as shown, is connected to a shifter lever 35 located within the cab 11. Shaft 30 is connected by a jointed transmission shaft 36 that operates the customary pump, not shown, but located within a gear box 37 secured on top of the beam 19 which latter, it will be noted, is pivoted to the longitudinal side beams of the truck frame 10. The construction and operation of the power mechanism for producing the tilting and return movements of the dumping platform or body 15 is assumed to be of well-known structure and not necessary to here further discuss.

In this improved arrangement for operating the loading and unloading mechanism hereinafter to be described, there is provided a secondary power take-off shaft 38, see particularly Figs. 1 and 6, that is journaled in and extends rearward from the secondary gear box 26. Secured on the inner end of secondary power take-off shaft 38 is a spur pinion 39 and a relatively large spur gear 40.

Mounted to slide upon but to rotate with the primary take-off shaft 24 is a spur gear 41. Journaled in the box 26 and meshing with the pinion 39 is an idle spur pinion or small gear 42. By sliding movements gear 41 can be engaged, at will, either with the gear 40 or with the intermediate pinion 42, thereby affording means for reversely driving the secondary power shaft 38 without changing the direction of rotation of the primary take-off shaft 24. The gears 32 and 41 now described are caused to rotate with shaft 24 but free to slide thereon by means of a long key-way 43. Shiftable gear 41 is a grooved hub 44 engaged by a shipper fork 45 carried by a shipper rod 46 that may be operated in any suitable way but, as shown, is connected to a lever 47 located in the cab 11.

Rigidly secured to the rear of the truck frame 10, by machine screws, welding or other suitable means, is a substantially U-shaped hollow gear housing 48, see particularly Fig. 3. This element 48 is preferably a cast iron structure formed with laterally spaced forwardly projecting arms or portions 49 and 50. Journalled in the left hand arm 49 is a shaft 51 and journalled in the right hand arm 50 is a shaft 52. These shafts 51 and 52 are parallel and at their front ends terminate, respectively, in angular coupling shanks 53 and 54, respectively. A sprocket chain 55 is encased within the transverse portion of the housing 48 and runs over sprocket wheels 56 and 57, respectively, on the shafts 51 and 52. Journalled in the right hand arm 50 of frame 48 is a short transverse shaft 58, the inwardly projecting end of which terminates in a squared or angular shank or end 59, see Fig. 4. Shaft 52 carries a spiral gear 60 that meshes with a spiral gear 61 on short countershaft 58.

Shaft 61 has a forwardly projecting end which, by a universal joint 62, see Fig. 3, is connected to the rear end of a shaft 63, the front end of which later, by universal joint 64, is connected to the rearwardly projecting end of secondary power take-off shaft 38, see Fig. 1.

In the preferred form of this improved device I employ three channel iron or channel-shaped coupling brackets 65 formed in their upper flanges with lock pin holes 66 and in their lower flanges with lock pin receiving notches 67, as best shown in Figs. 1 and 4. One of these coupling brackets 65 is rigidly secured by machine screws 68 to the inner wall of the gear box arm or extension 50, with the angular shank 59 of short transverse shaft 58 projecting through the central portion thereof; another of said coupling brackets 65 is likewise rigidly secured to the rear wall of the gear box extension or arm 50 with the shank 54 of shaft 52 projecting through the central portion thereof; and the third of said brackets 65 is likewise rigidly secured to the rear end wall of the gear box extension 49 with the shank 53 of shaft 51 projecting through the central portion thereof.

A conveyor frame 69, preferably an elongated channel-shaped structure, is, at its receiving end, provided with a driving roller 70, see particularly Fig. 4, and at its extended end is provided with a roller 70'. An endless conveyor belt 71 runs over the rollers 70 and 70'. Driving roller 70 is secured to a shaft 72 journalled in the sides of frame 69 and is provided at its projecting ends with angular shanks 73 and 74.

Pivotally secured to both the right and left hand sides of the receiving end of conveyor frame 69 are channel-shaped coupling brackets 75 through the central portions of which the angular shanks 73 and 74 project. The upper flanges of the coupling brackets 75 are provided with coupling pins 76 and the lower prongs of said coupling brackets are provided with coupling pins 77. The coupling pins 76 and 77 are engageable, respectively, with the holes 66 and notches 67 of coupling brackets 65.

As an intermediate coupling device to be used as hereinafter described, I employ a pair of coupling sockets 78 connected by universal joint 79, best shown in Fig. 4.

The pivotal connection between the coupling brackets 75 and the sides of the carrier frame 69 is preferably made as follows: The said brackets, by means of machine screws 80, are connected to discs 81 through the axis of which project the angular ends or shanks of roller shaft 72. The discs 81 are held against lateral movement but free for oscillatory movements by means of keeper lugs 82 secured to the sides of the frame 69.

In Fig. 2 the dumping body 15 is shown as provided at its rear end with a plurality of discharge openings equipped with gates 83.

*Operation*

In Figs. 1 and 4 the unloading attachment is shown as applied for the direct delivery of material from the truck to a receiving point at the rear of the truck. In this position the coupling pins 76 of the right hand coupling bracket 75 are engaged with the notch 66 in the coupling bracket 65 that is directly connected to the inner side of the arm 50, and the pin 77 is dropped into the notch 67, as shown in Fig. 4; and the shaft 58 is connected to the roller shaft 72 by applying the double-ended knuckle-jointed socket 78—79 to the angular ends or shanks of the shafts 58 and 72. When the conveyor is thus connected it is capable of considerable lateral swinging movement.

When the conveyor is to be applied for delivery of material from the truck in a transverse direction toward the right, the coupling bracket 75, shown at the right in Fig. 4, is applied to the coupling bracket 65 that is at the rear end of arm 50; but when the delivery is to be made toward the left, the coupling bracket 75, shown at the left in Fig. 4, will be applied to the coupling bracket 65 that is at the rear end of arm 49. It will now clearly appear that the endless conveyor belt 71 can be driven, at will, in the one direction for delivery of material from the truck and in the opposite direction for carrying material to the truck, simply by sliding adjustments of the gear 41, see Fig. 6, into engagement with the gear 40 or into engagement with the intemediate gear 42. However, the conveyor is intended generally for use to deliver material from a truck. If used to carry material to the truck, then the truck would usually have an open-ended box or similar carrying body.

Obviously, with this attachment the conveyor may be applied in various different ways for delivery of material rearward or sideways toward the right or toward the left.

A preferred embodiment of the invention has been illustrated, but it will be understood that various alterations may be made within the scope of the claims hereunto appended.

What I claim is:

1. In a motor-propelled vehicle having variable speed reversible wheel-connected transmission mechanism and a primary power take-off shaft driven from the latter, said primary take-off shaft involving front and rear sections and a clutch for connecting and disconnecting, at will, the sections of said power take-off shaft, of a secondary power take-off shaft, reverse gear mechanism operative to connect said secondary power shaft to the front or first section of said primary power take-off shaft, and a gear transmission box in which the ends of the secondary power take-off shaft and the ends of the sections of said primary power take-off shaft are journalled, and in which transmission box the said clutch and reverse gears are located.

2. In a motor-propelled vehicle having a variable speed reversible wheel-connected transmission mechanism and a primary power take-off shaft driven from the latter, said primary power take-off shaft involving front and rear sections and a clutch for connecting and disconnecting the same, at will, a truck frame supporting the elements above noted, an approximately U-shaped hollow frame rigidly secured to the rear of said truck frame and provided with laterally spaced, forwardly projecting arms, parallel loader driving shafts journalled in said arms and provided in the transverse portion of said U-shaped frame with sprockets, a sprocket chain running over said sprockets, the said secondary power take-off shaft being connected to one of the said sprocket-equipped shafts, a conveyor frame equipped with a driving roller, a driven roller and an endless conveyor belt, the shaft of said driven roller projecting at both ends, means for hanging said conveyor either toward the right or toward the left, and means for coupling the shaft of said driving roller to one or the other of said sprocket-equipped shafts according to the direction in which the conveyor is set.

3. The structure defined in claim 2 in further combination with a short transverse shaft journalled in one of the arms of said U-shaped frame and gear-connected to the one adjacent sprocket shaft, and means for supporting said conveyor frame in a position extended directly rearward from the truck and connecting the shaft of said driving roller to said transverse shaft.

4. In the motor-propelled vehicle having variable speed reversible wheel-connected transmission mechanism and a primary power take-off shaft driven from the latter, said primary take-off shaft involving front and rear sections and a clutch for connecting and disconnecting, at will, the sections of said power take-off shaft, of a secondary power take-off shaft, gear mechanism operative to connect said secondary power shaft to the front or first section of said primary power take-off shaft, and in which the mechanism for driving said secondary power take-off shaft includes a gear slidable on but rotatable with the first section of said primary take-off shaft, two axially spaced gears carried by said secondary power take-off shaft, an intermediate gear meshing with one of the gears of said secondary shaft, the gear on the first section of said primary power take-off shaft being slidably engageable, at will, with the intermediate gear or, at will, with the other gear on said secondary shaft.

WILMAR L. ERICKSON.